March 17, 1964
R. C. WOOFTER ETAL
3,125,299
VEHICLE LAMP MOUNTING
Filed June 12, 1961
4 Sheets-Sheet 2
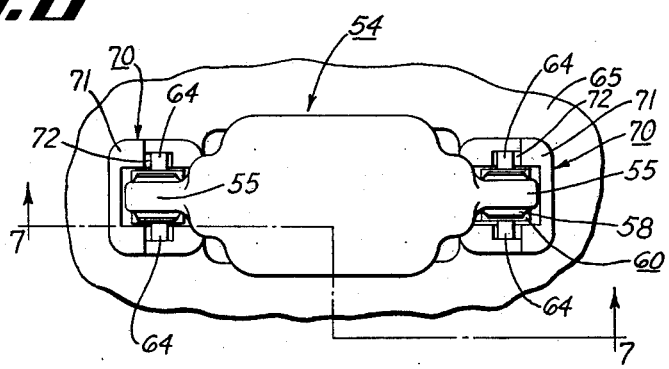
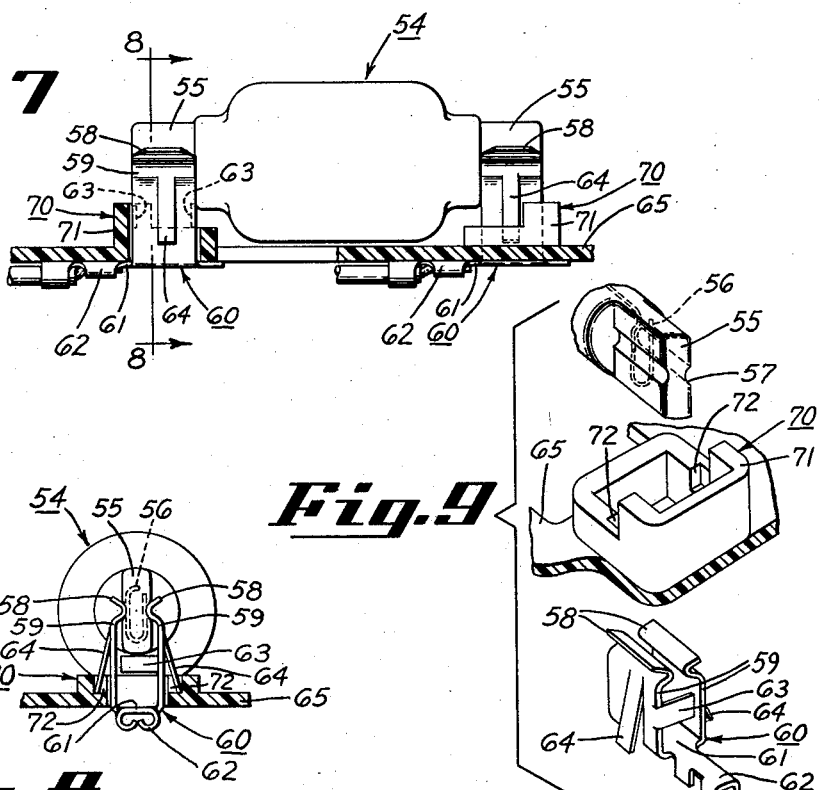
INVENTORS
ROBERT C. WOOFTER
RICHARD J. LANDER
SAMUEL G. GRIFFITH
BY
Albert H. Reuther
THEIR ATTORNEY INVENTORS
ROBERT C. WOOFTER
RICHARD J. LANDER
SAMUEL G. GRIFFITH
BY Albert H. Reutter
THEIR ATTORNEY March 17, 1964 R. C. WOOFTER ETAL 3,125,299
VEHICLE LAMP MOUNTING
Filed June 12, 1961 4 Sheets-Sheet 4

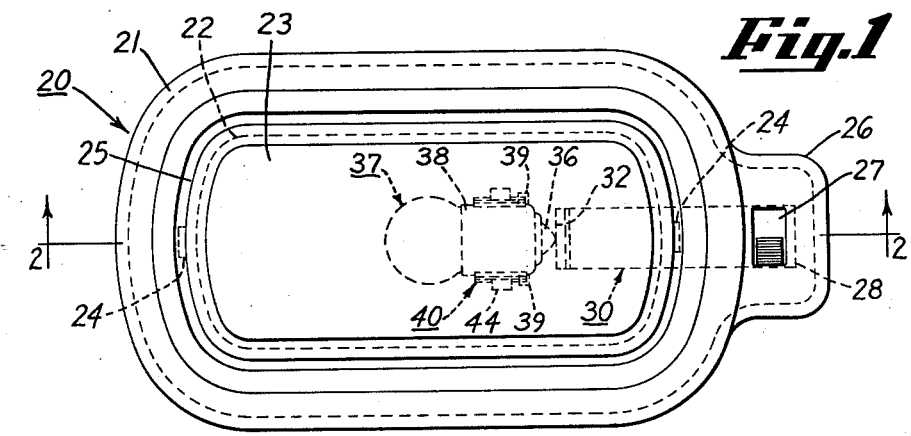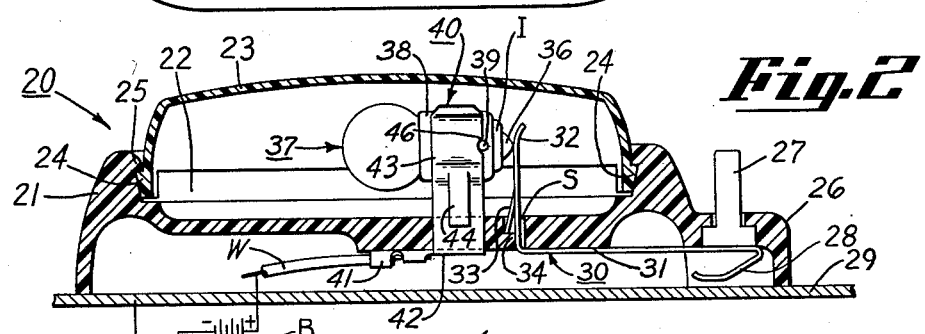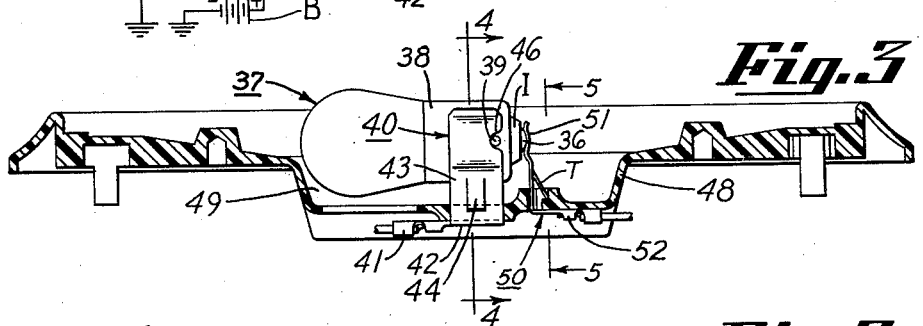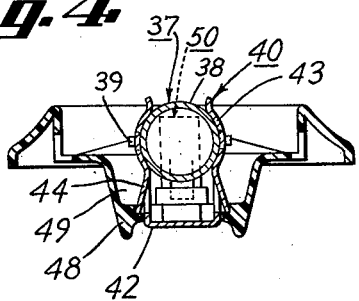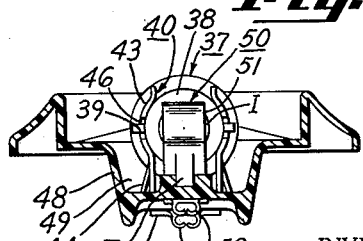

INVENTORS
ROBERT C. WOOFTER
RICHARD J. LANDER
SAMUEL G. GRIFFITH
BY
Albert H. Reutter
THEIR ATTORNEY

United States Patent Office 3,125,299
Patented Mar. 17, 1964

3,125,299
VEHICLE LAMP MOUNTING
Robert C. Woofter, Cortland, and Richard J. Lander and Samuel G. Griffith, Warren, Ohio, assignors to General Motors Corporation, Detroit, Mich., a corporation of Delaware
Filed June 12, 1961, Ser. No. 116,601
2 Claims. (Cl. 240—7.1)

This invention relates to illumination and mounting means for use on motor vehicles and the like.

An object of this invention is to provide a new and improved illumination and mounting means economical to produce and easy to assemble and disassemble with a minimum of parts and effort.

Another object of this invention is to provide a lamp mounting assembly including a base portion and lens portion both of insulating material with the lens portion adapted to be separable from the base portion by locking barbs on the lens portion that can be displaced by flexing for snap on-off engagement as well as twisting and the like for access to a lightbulb electrically engageable with at least one combination clip and terminal means both for mounting and electrical engagement of the bulb while a conductor is attached directly to a side of the clip and terminal means separated from the bulb by the base portion of the assembly.

Another object of this invention is to provide illumination and mounting means having a base portion of insulating material with an elongated cavity to be covered by a snap on-off lens of translucent flexible material and longitudinally adjacent to an on-off switch portion integral with the base portion having slots therein to receive a U-shaped combination clip and terminal means each having a pair of resilient clips of the U-shaped portion notched to provide an interlock for a pair of diametrically opposite bayonet-like lugs that project from a lampbulb having a central contact engageable electrically by a projection on a contact member having an extension arm with a hook end displaceable for ground connection by a button means movable in the switch portion while the projection urges the bulb and lugs thereof into interlock fit of the notched combination clip and terminal means.

A further object of this invention is to provide illumination and mounting means having a base portion of insulating material provided with a pair of pocket-like portions integral with the base portion and each having a substantially squared-off configuration as provided by walls and a pair of extensions thereof remote from each other on one side of each of a pair of parallel slots and undercut grooves in laterally opposite walls engageable by outwardly projecting barbs integral with a pair of legs of a U-shaped portion of combination clip and terminal means having a conductor crimp portion, a base of which is common to the crimp and U-shaped portions and that can be retained in the socket-like portions so as to be spaced a predetermined distance from each other with hook-like bent free ends of each of the legs having inwardly-extending parallel and arcuate bulb-engaging portions.

Still a further object of this invention is to provide illumination and mounting means having a base portion of insulating material provided with multiple terminal means having at least one thereof provided with a U-shaped portion of combination clip and terminal means having a conductor crimp portion, a base of which is common to crimp and U-shaped portions with the latter including a pair of resilient integral legs each having a notch-like recess along one edge against which bayonet lugs of a lampbulb base can be urged into a locking position maintained by further terminal means to include a crimp portion angularly integral with at least one generally wavy end portion to abut axially against the lampbulb base both for electrical energization and resilient urging of the base lugs into each of the notch-like recesses.

Another object of this invention is to provide lamp-mounting terminal means including a wire crimp portion integral laterally with a base of a U-shaped portion including legs each having a semi-annular portion substantially parallel to the other and provided with notch-like axial edge recesses to complement diametrically opposite lug-like projections of a bayonet-type lampbulb base resiliently urged longitudinally thereof to assure locking engagement of the lugs in the edge recesses.

Further objects and advantages of the present invention will be apparent from the following description, reference being had to the accompanying drawings wherein preferred embodiments of the present invention are clearly shown.

In the drawings:

FIGURE 1 is a plan view of one lamp mounting assembly in accordance with the present invention.

FIGURE 2 is a cross-sectioned elevational view taken along line 2—2 in FIGURE 1.

FIGURE 3 is a cross-sectional view of a lamp mounting and terminal assembly similar to that of FIGURE 2.

FIGURES 4 and 5 illustrate end views in the directions of arrows 4 and 5, respectively, in FIGURE 3.

FIGURE 6 is a fragmentary plan view of another lamp mounting and terminal assembly in accordance with the present invention.

FIGURE 7 is a cross-sectioned elevational view taken along line 7—7 in the assembly of FIGURE 6.

FIGURE 8 is a sectional view taken along line 8—8 in FIGURE 6.

FIGURE 9 is an exploded perspective view of terminal and bulb mounting means of FIGURE 6.

Figure 10:
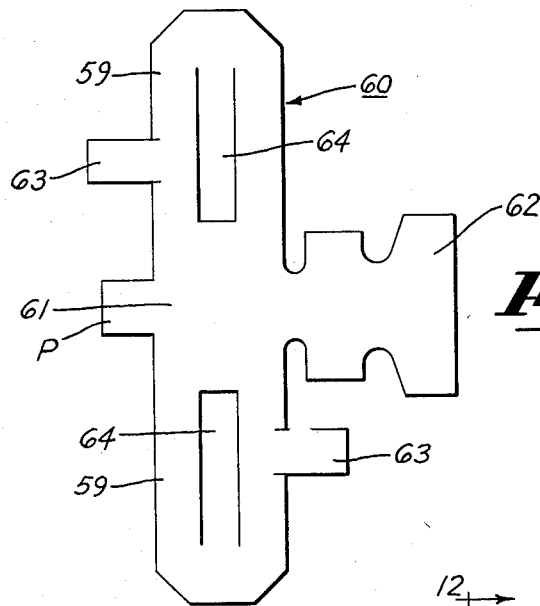
Figure 11:
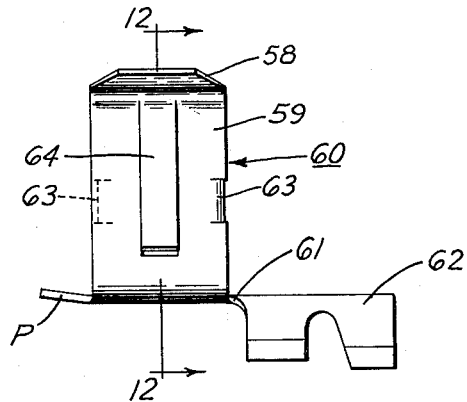

FIGURES 10 and 11 show blank and side views, respectively, of the terminal means used in the assembly of FIGURE 6.

Figure 12:
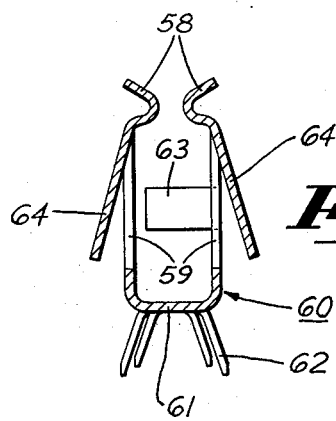

FIGURE 12 is a sectional view taken along line 12—12 in FIGURE 11.

Figure 13:
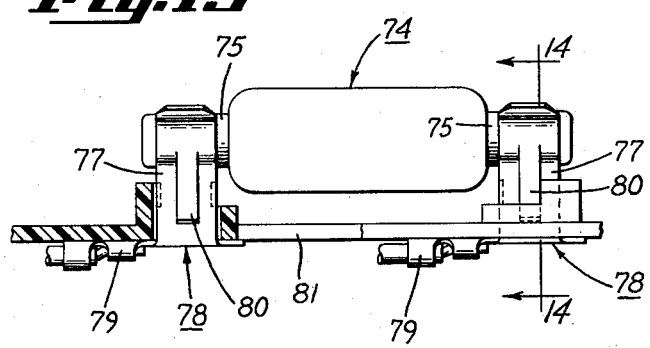

FIGURE 13 is a fragmentary side view of a lampbulb and terminal assembly similar to that of FIGURE 7.

Figure 14:
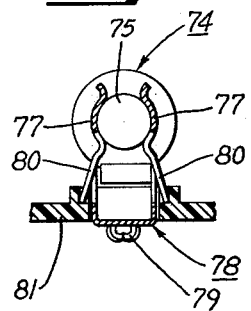

FIGURE 14 is a fragmentary end view of the assembly in FIGURE 13.

Figure 15:
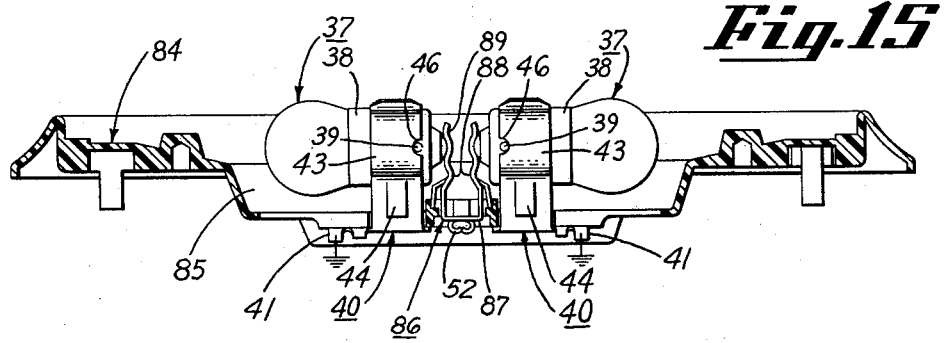

FIGURE 15 is a cross-sectioned elevational view of a lamp-mounting terminal assembly similar to that of FIGURE 3.

Figure 16:
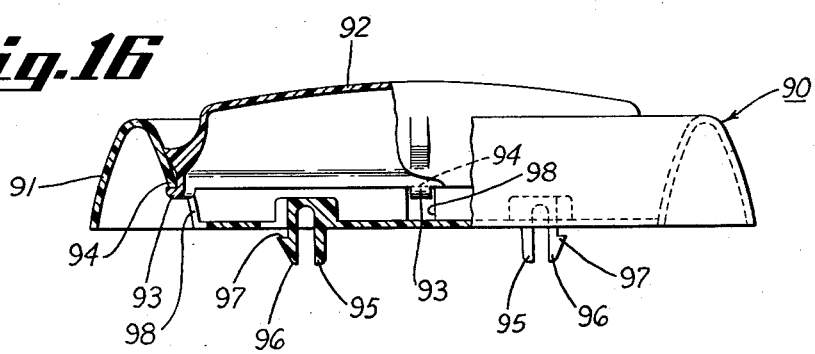

FIGURE 16 is an elevational view of another lamp mounting assembly particularly sectioned to show another lens fastening structure.

A need exists in the automotive industry for newly simplified and improved illumination and mounting means for use on motor vehicles including structures such as dome lamps, parking lamps, trunk lamps, back-up lamps, marker lamps and other applications where lighting might be desired. In some instances, an illumination and lamp-mounting assembly can include integral switching means and views of FIGURES 1 and 2 illustrate improvements in such an assembly. FIGURES 1 and 2 include a showing of a lamp-mounting and switch assembly generally indicated by numeral 20 having an elongated base portion 21 of insulating material with a substantially rectangular elongated cavity 22 to be covered by a snap on-off lens 23 of translucent and flexible plastic material. The lens 23 includes at least a pair of opposite barb-like projections 24 integral therewith and adapted to engage an undercut bezel-like flange portion 25 integral with the base portion 21 and substantially surrounding the cavity 22. Integral adjacent to one end of the base portion 21 there is an extension 26 slotted or apertured to receive a switch button or cam-like actuator 27 engaged by a resilient end or hook-like contact portion 28 displaceable by the button or actuator 27 to be in and out of engagement with a sheet metal mounting member or panel 29 of a motor vehicle. This panel or mounting member 29 can be grounded electrically relative to a battery B which is provided to energize a lampbulb or illumination means as will be described in further detail in the following paragraphs.

The end 28 which is resiliently displaceable for establishing electrical energization relative to the battery B can be an integral part or extension of a terminal means generally indicated by numeral 30 in FIGURE 2 and including a longitudinally extending floor portion which interconnects the end 28 to a lampbulb engaging contact portion 32 extending angularly to one side thereof so as to form a substantially L-shaped configuration. The contact engaging end portion 32 projects through a slot S in the base portion 21 and extends transversely with respect to the elongated cavity 22. A laterally bent tang 33 integral at one end with the contact portion 32 and having a free end abutting against a shoulder 34 can lock the terminal means 30 against inadvertent removal from the base portion 21. Flexibiilty of the end 28 is enhanced by length of the floor portion 31 of the terminal means 30 and fitting of the contact portion 32 to project through the slot S permits the contact portion 32 of the terminal means 30 to abut resiliently against a contact 36 extending axially from a lampbulb generally indicated by numeral 37 and including a cylindrical or substantially annular metal base portion 38 having substantially diametrically opposite lug-like bayonet projections 39 provided laterally therewith. Suitable insulation I can separate contact 36 from the metal sleeve 38 such that opposite ends of a filament (not shown) inside the lampbulb 37 can be electrically attached for energization between the contact 36 and metal sleeve 38. The contact portion 32 of terminal means 30 can provide both electrical engagement for energization as determined by button or actuator movement as well as axial biasing of the lampbulb 37 to have the bulb urged into interlocking engagement with a further terminal means generally indicated by numeral 40 in FIGURE 2.

This terminal means 40 includes a wire crimping portion 41 adapted for direct attachment to a conductor or wire W energized from battery B with the wire W coming directly from an electrical wiring harness and the like to avoid necessity for additional terminal blocks, studs, terminals, blades and other attachments. The crimp portion 41 is integral with a base 42 of a U-shaped portion including a pair of integral contact legs 43 which are adapted to embrace the sleeve-like metal base 38 of the lampbulb 37. Laterally outward extending tang means 44 are provided integrally with each of the legs 43 and these tangs 44 are adapted to abut and engage one side of the base portion 21 in locations adjacent to substantially parallel cutouts through which the legs 43 project. The floor-like base 42 integral with both the crimp portion 41 and legs 43 can engage an opposite side of the base portion 21.

The lug-like projections 39 of the bayonet-type lampbulb 37 can engage one of a pair of diametrically oppositely located notch-like recesses 46 under resilient urging of the contact portion 32 of the other terminal means 30 thus establishing electrical interconnection as well as interlocking of the lampbulb and terminal means 40.

FIGURES 3, 4 and 5 of the drawings illustrate in further detail illumination and terminal mounting means similar in structure to that of FIGURES 1 and 2. In place of terminal means 30 for use in conjunction with a switch portion immediately adjacent to and integral with the lamp-mounting base portion there is provided a modified base portion 48 of insulating material having an elongated cavity 49 therewith and adapted for mounting of a terminal means generally indicated by numeral 50. The terminal means 50 includes a wavy-contact end portion 51 axially and resiliently engageable with a lampbulb means such as 37. Also the terminal means 50 includes a crimp portion 52 angularly disposed with respect to the wavy contact portion 51 and integral therewith. The crimp portion 52 engages one side of the mounting base portion 48 and laterally grooved slots similar to the slot S in base portion 21 can be provided to accommodate the terminal means 50 as well as combination clip and terminal means 40 which are alike for the embodiments of FIGURES 2 and 3.

FIGURE 4 represents an end view taken in the direction of arrow 4 in FIGURE 3 to show more clearly how the terminal means 40 provided with legs 43 having notch-like recesses 46 can assure polarized mounting and interlock of the lampbulb means 37 thereto. There is a polarized positioning of the lampbulb 37 having the laterally outwardly projecting lugs 39 engageable in the cutout recesses or notches 46 and the contact portion of the secondary terminal means such as represented by numerals 30 and 50 can effect resilient biasing and electrical engagement of the lampbulb means in such polarized positioning.

FIGURE 5 illustrates an end view of structure in the direction of arrow 5 in FIGURE 3. It is to be noted that a tang T assures locking of terminal means 50 relative to the base portion 48 and this tang T can be seen extending integrally from the contact portion 51 in FIGURES 3 and 5. It is to be noted that the interlock and interconnection electrically of the terminal and bayonet-type lampbulb means as resiliently maintained by axial pressure of resilient contact portions can permit horizontal as well as vertical mounting of the lampbulb means depending upon angular positioning of base portions such as 21 and 48.

FIGURES 6 through 12 illustrate further illumination and terminal mounting means adapted for use particularly with a cartridge-like cylindrical lamp means generally indicated by numeral 54 and including a pair of integral and oppositely extending web ends 55. Preferably this lamp means 54 is made entirely of glass in a bulb free of any metal base portions and having metal filament wire projecting outwardly adjacent to at least one side of a web portion such as 55. FIGURES 6, 7 and 8 show this cartridge-like lamp means 54 with integral web ends 55 installed relative to a terminal mounting and base portion assembly represented further in a perspective exploded view of FIGURE 9. Filament wiring 56 can be seen in a fragment of the web end 55 having opposite longitudinal grooves 57 therein engageable by hook-like bent free ends 58 substantially parallel to each other and integrally formed with resilient arms or legs 59 of a terminal means generally indicated by numeral 60. The terminal means 60 further includes a bottom or base portion 61 integral with a wire crimp portion 62 as can be best seen in views of FIGURES 7, 8 and 9. FIGURES 10, 11 and 12 show the terminal means 60 in further detail and it is to be noted that each of the arms or legs 59 includes an integral spacer projection 63 adapted to be bent transversely with respect to the leg integral therewith and extending toward an opposite leg so as to limit movement of the resilient arms or legs toward each other. The spacer projection 63 can thus assure sufficient spacing between the arcuate bulb-engaging portions 58 and the drawings illustrate transverse positioning thereof with respect to the arms. Also, it is to be noted that each of the arms 59 includes a locking tang 64 adapted to abut in a recess provided in a base portion 65 which can have suitable slots substantially parallel to each other so as to permit fitting of the arms or legs 59 therethrough with the locking tang 64 in engagement with one side of the base portion 65 while the base or floor 61 engages an opposite side thereof. FIGURES 6, 7 and 9 further illustrate squared-off socket-like portions generally indicated by numeral 70 and integral with the base portion 65. Each of these socket-like or pocket-like portions are formed of walls including a pair of extensions thereof indicated by numeral 71 remote from each other on one side of each of a pair of substantially parallel slots through which the arms or legs 59 can be inserted. There are undercut portions or grooves 72 in opposite walls immediately adjacent to termination of the extension 71 and the locking tang 64 of terminal means 60 can fit therein.

FIGURES 13 and 14 illustrate side and end views, respectively, of a cartridge-like lamp and terminal mounting means similar to that shown in FIGURES 6, 7 and 8. A lampbulb means generally indicated by numeral 74 includes a central cylindrical glass envelope as well as a pair of opposite metal sleeve-like end portions 75 adapted to fit between arcuate legs 77 of combination clip and terminal means generally indicated by numeral 78. Each of these combination clip and terminal means 78 can have a crimp portion 79 integrally therewith as well as laterally outwardly projecting tangs 80 adapted to abut against a mounting panel or base portion 81 having suitable passages or slots therein through which the arcuate legs 77 can be fitted. It is to be noted that the terminal means 78 is different than the terminal means 60 which includes the limit projections 63 as well as the stabilizing projection P visible in FIGURES 10 and 11.

FIGURE 15 illustrates a base portion generally indicated by numeral 84 providing a cavity 85 extending longitudinally thereof and including provision for mounting two lampbulb means such as generally indicated by numeral 37 as noted for the structure of FIGURE 2. The base portion 84 is made of moldable insulating material and terminal means generally indicated by numeral 40 can be fitted thereto as previously described. Each of the legs or arms 43 of terminal means 40 can be provided with a cutout or notch-like recess 46 in which a bayonet lug or lateral projection 39 of the bulb can be fitted for polarizing engagement therewith. A pair of combination clip and terminal means 40 having such notches can be provided and only a single common ground connection can be provided by use of a terminal means generally indicated by numeral 86 having a generally U-shaped configuration including a midportion 87 which can be provided with an integral crimping or wire attaching portion as well as a pair of resilient legs 88 each provided with wavy end portions 89 which can bias the two lampbulb means 37 in opposite directions axially away from each other though assuring interlocking of the bayonet lugs 39 relative to the notch-like recesses 46 for polarization relative to the terminal means 40. Suitable tangs can be provided on opposite sides and extending integrally from the legs 88 for holding the terminal means 86 in position relative to the base portion 84. It is to be understood that a suitable lens of translucent plastic or glass-like material can be fitted to the base portion 84.

FIGURE 16 provides a side view of a further lamp mounting assembly generally indicated by numeral 90 and including a base portion 91 as well as a lens 92 having integral hook-like projections 93 adapted to snap fit along an underside of a flange 94 of the base portion 91. The base portion 91 can be provided further with a pair of projections 95 and 96 adapted to fit in a mounting panel aperture on a motor vehicle such that a barb or lateral projection 97 integral with the projection or member 96 can establish locked engagement with the aperture having a peripheral edge adapted to be engaged by this barb 97. The lens 92 can be removed from the base portion by rotating the lens in either direction. The lens locking barbs or projections 93 cooperate with ramps 98 adjacent to the flange portion 94. Three or more lens locking barbs or projections 93 can be provided on an annular lens, for example, such that three slots or openings adjacent to ramps 98 can be provided in the plastic base portion 91. Thus, when the lens is rotated in either direction the angle of the ramps 98 which in effect are edges defining openings adjacent thereto permit the lens locking barbs or projections 93 to contact the ramps. Continued rotation of the lens causes the lens locking barbs to move inwardly and once the barbs or projections 93 have cleared the opening the lens is released to be removable from the base portion 91. The lens can be easily reassembled to the base portion by aligning the lens locking barbs with the openings or slots provided adjacent to the ramps 98 and the lens can be resiliently snapped into place for locking engagement with the base portion 91.

It is to be understood that base portions such as 21 and 48 can be provided with screw holes for mounting or with integrally molded on springing nibs or projections such as 95—96—97 shown in FIGURE 16. It is to be noted that the illumination and terminal mounting means in accordance with the present invention can be made chiefly of insulating materials including moldable plastic and the like which can be pre-colored to blend or contrast with interior decorations and upholstery of a motor vehicle. Differing terminal means connected directly to wiring can permit a saving in additional connections and assembly time can be appreciably reduced with a minimum of parts and effort. In view of polarized fit of bayonet projections on a lampbulb means relative to notches with respect to terminal means 40 it is believed that such illumination and mounting means in accordance with the present invention can provide more advantageous and economical assembly and disassembly of components on a motor vehicle.

While the embodiments of the present invention as herein disclosed constitute preferred forms, it is to be understood that other forms might be adopted.

What is claimed is as follows:

1. Illumination and mounting means, comprising, a mounting base member of insulating material provided with a pair of pocket-like socket portions integral with said base member and each having a substantially squared-off configuration as provided by walls and a pair of extensions thereof remote from each other on one side of undercut grooves in laterally opposite walls, a pair of identical terminal means each having integral wire crimp and U-shaped clip portions with laterally outwardly projecting barbs locking in the undercut grooves of each pocket-like socket portion, and an all-glass cylindrical bulb means having integral web ends on opposite sides thereof fitting into said clip portions and electrically engaging with the filament wiring directly.

2. The illumination and mounting means of claim 1 wherein said terminal means include arcuate resilient legs in said clip portion, each of said legs having a tang projecting substantially transversely and integrally therefrom to limit movement of said legs toward each other, and a stabilizing projection abutting against said base member in a location intermediate said legs.

References Cited in the file of this patent

UNITED STATES PATENTS

| | | |
|---|---|---|
| 2,091,490 | Prance | Aug. 31, 1937 |
| 2,229,989 | Roby | Jan. 28, 1941 |
| 2,428,167 | Linton | Sept. 30, 1947 |
| 2,431,366 | Buell | Nov. 25, 1947 |
| 2,674,724 | Just | Apr. 6, 1954 |
| 2,886,792 | Maiershofer | May 12, 1959 |